United States Patent [19]

Banji

[11] Patent Number: 5,368,422
[45] Date of Patent: Nov. 29, 1994

[54] METHOD FOR MANUFACTURING GOLF CLUB HEADS OR THEIR PROTOTYPES

[75] Inventor: Masatoshi Banji, Kobe, Japan

[73] Assignee: Sumitomo Rubber Industries, Inc., Kobe, Japan

[21] Appl. No.: 70,761

[22] Filed: Jun. 3, 1993

[30] Foreign Application Priority Data

Jun. 8, 1992 [JP] Japan .................... 4-174693

[51] Int. Cl.5 .................... B23B 1/00; B23C 3/04
[52] U.S. Cl. ........................ 409/84; 142/13; 144/365; 409/132; 409/199
[58] Field of Search ............ 409/132, 131, 84, 198, 409/199, 201, 216; 144/356, 365; 29/560, 27 C; 142/11, 13, 15, 22, 35

[56] References Cited

U.S. PATENT DOCUMENTS

| | | | |
|---|---|---|---|
| 1,368,035 | 2/1921 | Kay | 29/40 X |
| 4,031,809 | 6/1977 | Shraiman et al. | 409/84 |
| 4,057,893 | 11/1977 | Smith et al. | 29/560 |
| 4,512,380 | 4/1985 | Schmidt | 144/356 X |
| 4,750,537 | 6/1988 | Green | 144/363 |
| 4,968,195 | 11/1990 | Hayakawa et al. | 409/84 |
| 5,125,775 | 6/1992 | Breuer et al. | 409/132 |
| 5,222,283 | 6/1993 | Laschet | 29/27 C |

Primary Examiner—Z. R. Bilinsky
Attorney, Agent, or Firm—Armstrong, Westerman, Hattori, McLeland & Naughton

[57] ABSTRACT

A material of which a golf club head or a prototype thereof is made is held such that it is pivoted and indexed about a single axis of a holding installation. This material is cut in a predetermined outer surface configuration of a golf club head by means of a cutter means while the material is rotated about said axis, and is successively brought to a standstill at predetermined angles, or while the material is continuously rotated.

13 Claims, 2 Drawing Sheets

METHOD FOR MANUFACTURING GOLF CLUB HEADS OR THEIR PROTOTYPES

BACKGROUND AND SUMMARY OF THE INVENTION

The present invention relates to a method for manufacturing golf club heads or their prototypes.

Golf club heads and their prototypes such as clay models for the identification of golf club heads, and electro-spark machining electrodes for making metallic molds applied to the manufacturing of golf club heads are a small amount of production items based on special manufacturing specifications, and these items are manufactured by means of hand-carving or a numerically controlled computerized machine tool.

Specifically, in a conventional method for manufacturing golf club heads or their prototypes, as shown in FIG. 3, a material a, of which a golf club head or a prototype thereof is made, is firstly formed in a configuration of a rectangular parallelepiped. Next, the formed material a is set to a numerically controlled computerized milling machine (not shown), or any other similar machine, to cut this material as instructed by means of information data as inputted in a controlling system in advance. In this case, cutting is started on a surface b of the material a by using a cutting machine, such as an end mill, and is performed such that an outer frame portion c, connecting support end portions h, h and the other portions which correspond in shapes to a golf club head or a prototype thereof which is intended to be manufactured are left unmachined.

Subsequently, the material a is removed from the numerically controlled computerized milling machine, and is reversed through 180 degrees to reset it to the milling machine. Cutting is again started on the opposite side of the material, and is performed upon the other unmachined portions to form a golf club head or a prototype e thereof as illustrated in FIG. 3.

In practice, two surfaces, a horizontal surface and a vertical surface of the four outer peripheral surfaces of the material are earlier machined as reference surfaces f and g on which the computerized milling machine relies to proceed with the machining operation thereof. In a computer program which allows the milling machine to cut the material as intended, these reference surfaces f and g are also set as the starting points for the machining operation of the milling machine to both sides of the material. This prevents any variance between both sides of the material in their shapes, thereby obviating any configurational difference between both sides of a resulting golf club head or a prototype thereof.

In the foregoing conventional method for manufacturing golf club heads or their prototypes, therefore, the reference surfaces f and g of the material a are required to be pre-machined and aligned with each other before the material a is cut to form a golf club head or a prototype thereof. For this reason, the conventional manufacturing method necessitates a greater amount of time for prior processing operation. Also, the provision of the reference surfaces f and g as the starting points for the machining operation can not prevent configurational irregularity of a resulting golf club head or a prototype thereof. These are disadvantages of the conventional manufacturing method.

It is therefore an object of the present invention to provide a method for manufacturing golf club heads or their prototypes efficiently and with high accuracy, in which the foregoing disadvantages are overcome.

BRIEF DESCRIPTION OF THE DRAWINGS

The present invention will be described with reference to the accompanying drawings, in which.

DETAILED DESCRIPTION OF THE PREFERRED EMBODIMENT

A preferred embodiment of the manufacturing method of the present invention for golf club heads or their prototypes will be described with reference to the accompanying drawings.

Figure 1:
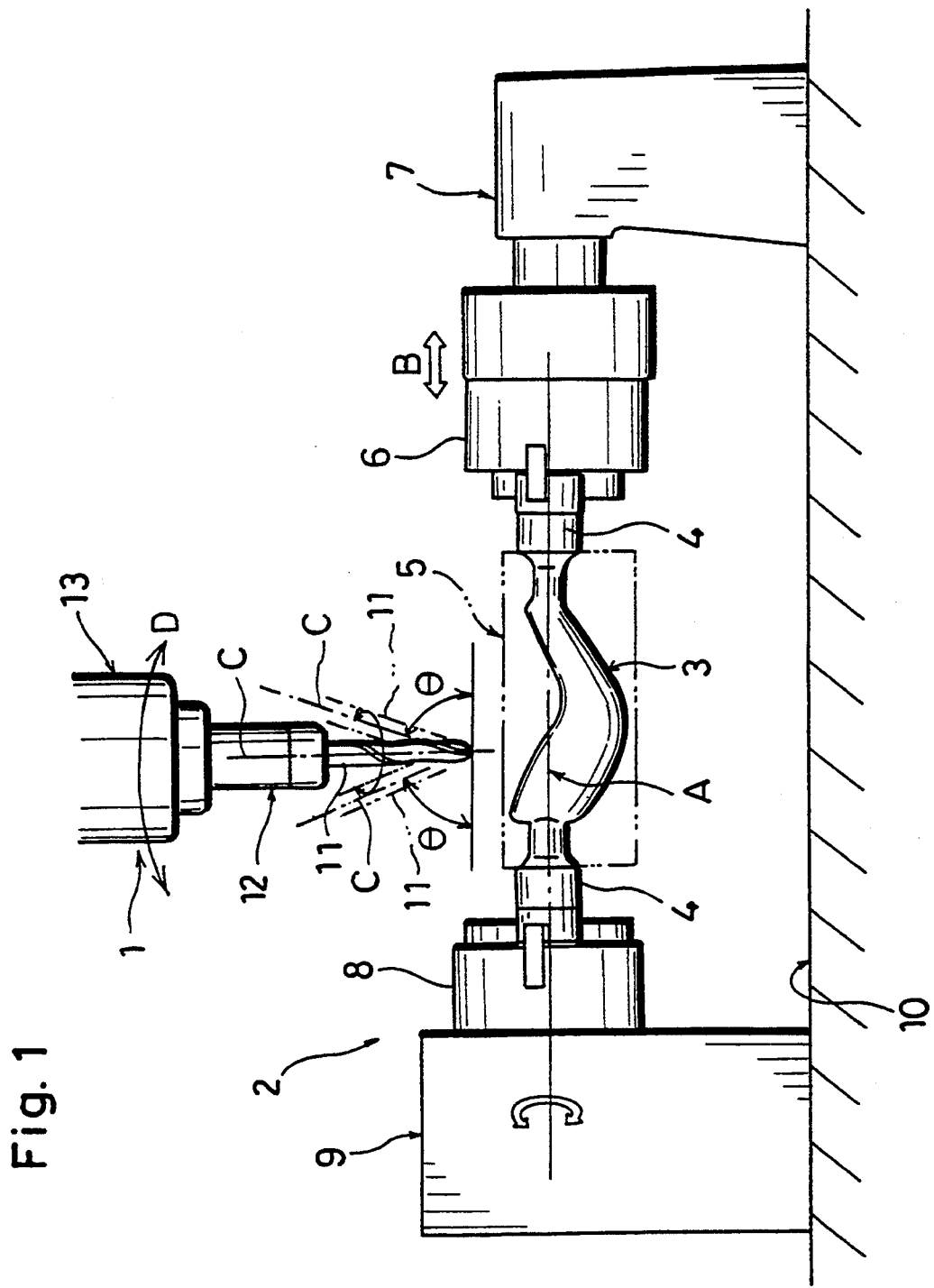
FIG. 1 is a front view of a principal portion of a machine tool applied to the manufacturing method of the present invention.

In FIG. 1, a numerically controled computerized machine tool 1 such as a machining center or other similar machine tool is equipped with a holding installation 2. This computerized machine tool 1 is used to form golf club heads or their prototypes 3 which are a small amount of production items on the basis of special manufacturing specifications.

In this case, the prototypes 3 are clay models for the identification of golf club heads, and electrospark machining electrodes for metallic molds applied to the manufacturing of golf club heads.

A golf club head or a prototype 3 thereof which is formed in a configuration shown in FIG. 1 is cut away in connecting support end portions 4, 4 thereof, now that they become superfluous when the golf club head or the prototype 3 thereof is completed in the formation thereof. Subsequently, the golf club head or the prototype thereof 3 is machined in the portions which have the connecting support end portions 4, 4 cut away from them, to thereby finish them in a predetermined configuration.

If the prototype 3 is an electrospark machining electrode, it is used for producing a metallic mold applied to mass production of golf club heads by means of forging or casting.

A material 5 of which the golf club head or the prototype 3 thereof is made is supported by means of the holding installation 2 such that it is pivoted and indexed about a single axis A of the holding installation 2 as illustrated in an imaginary line in FIG. 1.

The holding installation 2 comprises a tailstock 7 provided with a first chucking portion 6 which holds the right hand side connecting support end portion 4, and a headstock 9 including a second chucking portion 8 which holds the left hand side connecting support end portion 4.

The first chucking portion 6 and the second chucking portion 8 are arranged to be pivotable about the axis A of the holding installation, and the first chucking portion 6 alone is designed to be horizontally movable in the direction of the arrowhead B.

The headstock 9 is provided with a driving means (not shown) such as an electric motor, or other similar driving means, which is used to rotate the second chucking portion 8, thereby allowing the second chucking portion 8 to rotate or come to a stop at predetermined rotating angles, or predetermined circumferential positions thereof as respectively instructed by means of information data inputted in advance in a controlling system (not shown).

The numerically controlled computerized machine tool 1 is provided with a table 10 fitted with the holding installation 2, a holder member 12 which holds a cutter means 11 such as an end mill or other similar cutting means, and a head portion 13.

The head portion 13 is equipped with an electric motor (not shown) which rotates the cutter means 11 through the holder member 12 about an axis C thereof which moves in a plane that intersects with the foregoing axis A at substantially right angles. The holder member 12 is detachably attached to the end portion of the head portion 13. Also, the cutter means 11 is desirably to be fitted with a cutting blade not only in the end thereof but also in side portions thereof which cover predetermined length of, for example, approximately 60 mm.

The head portion 13 is allowed to move linearly toward and away from the work in the direction of the axis C by using an electric motor (not shown) or other similar driving means. The linear movement of the head portion 13, the rotating movement of the second chuck portion 8 which is given by means of the driving means (not shown) incorporated in the headstock 9, and the rotating movement of the cutter means 11 which is given by using the motor (not shown) included in the head portion 13 are program controlled through the controlling system (not shown) which has information data inputted in advance therein.

The numerically controlled computerized machine tool 1 is provided with a containing magazine (not shown) containing a plurality of other holder members 13 than illustrated in FIG. 1, which hold other cutter means 11 than illustrated in FIG. 1, and an automatic tool replacing device (not shown).

In compliance with instructions given by information data inputted in advance in the controlling system (not shown), the automatic tool replacing device automatically replaces the holder members 12 attached to the head portion 13 with new holder members included in the containing magazine, through the foregoing controlling system.

Since the numerically controlled computerized machine tool 1 and the holding installation 2 are arranged as described in the foregoing, the holding installation 2 is allowed to hold the material thereon, and to index the material 5 continuously and automatically about the axis A of the holding installation 2 through predetermined angles in accordance with instructions given by information data as inputted in advance in the controling system. The material 5 brought to a standstill at each predetermined angle, can be cut in predetermined three-dimensional curved surfaces thereof from the substantially perpendicular direction to the axis A by using the cutter means 11 under rotation.

That is to say, if the numerically controlled computerized machine tool 1 and the holding installation 2 which embody the manufacturing method of the present invention are used to cut a golf club head material or other similar work which is furnished with complicated curved surfaces making it impossible to cut the entire outer surface thereof from a single direction, the work can be turned so that any surface portion thereof which is required to be cut is always allowed to be cut divisionally and successively, whereby the cutting of the entire outer surface of the work is finally achieved.

The following is an example of the foregoing method of the present invention for manufacturing golf club heads or their prototypes 3, in which the surface of the material 5 is divided into two machining sections, and these two machining sections are successively subjected to cutting operation.

First of all, the material 5 is formed by using other machining operation than described herein to furnish it with a cutting allowance, and this material 5 is clamped in the connecting support end portions 4, 4 thereof by means of the first chucking portion 6 and the second chucking portion 8 of the holding installation. The holder member 12, in which a predetermined kind of cutter 11 is held, is attached to the end portion of the head portion 13, and this cutter 11 is positioned in a starting point for machining which is set by information data inputted in advance in the controling system.

Subsequently, information data prepared by means of, for example, an automatic programing apparatus is inputted in the foregoing controlling system to start the machining operation of the computerized machine tool. In this case, the information data is data for the use of the cutting operation which is prepared for each configuration of, for example, two sections into which the outer surface configuration of the golf club head is divided.

If the cutting operation of the machine tool is started, the second chucking portion 8 is rotated, and the material 5 comes to a standstill at a predetermined angle (for example, 0) at which the indexing operation of the computerized machine tool is begun. Next, the table 10 and/or the head portion 13 are moved at a predetermined feeding speed, and as shown with a full line in FIG. 2, the material 5 is cut by means of cutting blades attached to the end portion and the side portions of the cutter means 11 under rotation, thereby forming the intended configuration of the upper half surface of the golf club head in the material 5.

Figure 2:
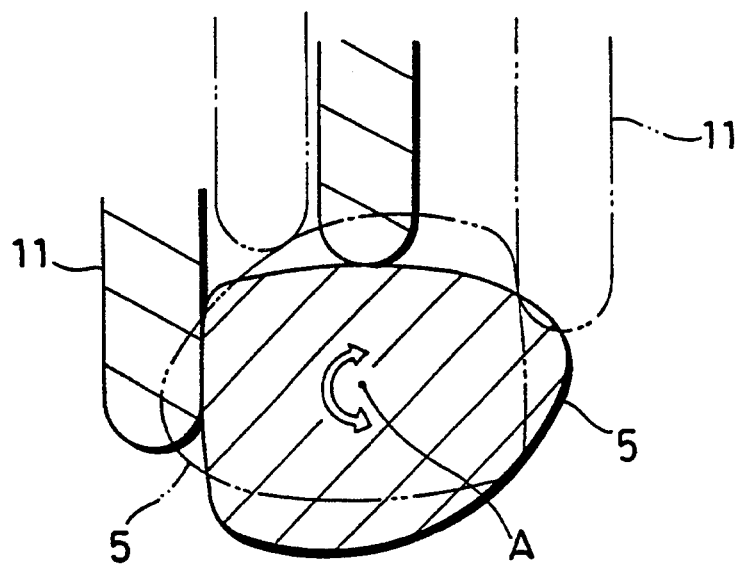
FIG. 2 is an explanatory diagram which shows that a material applied to the manufactuirng method of the present invention is being cut.
Figure 3:
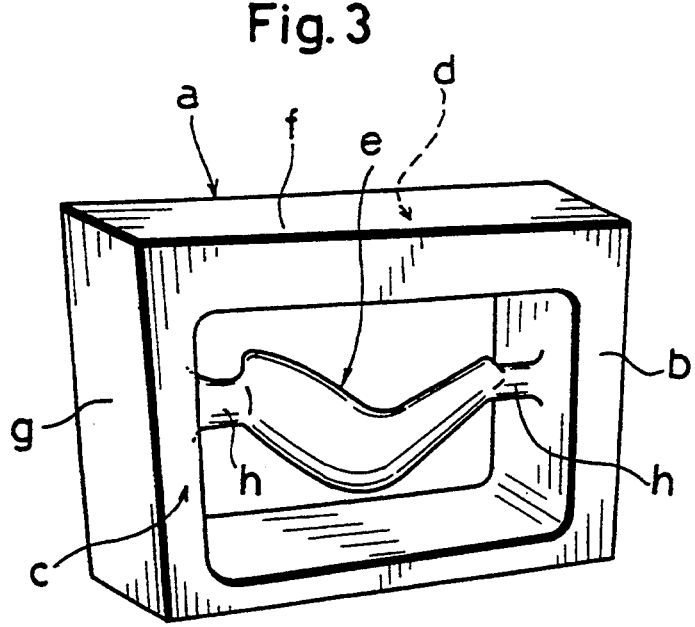
FIG. 3 is a perspective view of a golf club head or a prototype thereof which is manufactured by using a conventional manufactuirng method.

After the machining operation of the upper half surface of the material is finished, the material 5 is pivoted about the axis A of the holding installation 2, and comes to a standstill in a position thereof in which the material is reversed through 180 degrees, as shown with an imaginary line in FIG. 2. Subsequently, the material 5 is cut in an unmachined lower half surface thereof by using the cutter means 11 shown by an imaginary line in FIG. 2, whereby the material is furnished with the intended configuration of the lower surface of the golf club head.

The material 5 is allowed to be successively brought to a standstill at 120 degrees, 90 degrees and 60 degrees. Alternatively, the material 5 may be cut by means of the cutter means 11 while being continuously rotated about the axis A of the holding installation.

If the work, namely, the material 5, is wood, plastics, clay or other similar substance, the cutter means 11 is desired to be 500 rpm to 4500 rpm in the rotational frequency, 100 mm/min to 2500 mm/min in the feeding speed thereof (the speed at which the cutter means is horizontally fed in the direction of the axis A), and 0.1 mm to 60 mm in the cutting depth thereof.

If the work (the material 5) is metal, the rotational frequency of the cutter means 11 and the feeding speed thereof are desired to be respectively 300 rpm to 400 rpm and 50 mm/min to 800 mm/min. The cutting depth of the cutter means 11 is 0.1 mm to 60 mm as given in the preceding.

The numerically controlled computerized machine tool is arranged to subject the material selectively to rough machining operation, middle machining operation or finish machining operation, and to automatically change the cutter means 11 in compliance with the foregoing information data by means of the foregoing automatic tool replacing device so that a cutter means optimum from the viewpoints of diameter and kind according to the foregoing machining type is selected. This achieves efficient machining operation to the material 5.

The following table shows the rotational frequency, the feeding speed, and the cutting depth of the cutter means 11 which are optimum for each of the rough machining operation, the middle maching operation and the finish machining operation according to the kinds of the materials.

In the numerically controlled computerized machine tool 1 and the holding installation 2, the cutting accuracy can be set in units of 0.01 mm to 0.001 mm.

TABLE

| | Rough Machining | Middle Machining | Finish Machining |
|---|---|---|---|
| Plastic | | | |
| Rotational Frequency of Cutter Means (rpm) | 2000 | 4000 | 4000 |
| Feeding Speed of Cutter Means (mm/min) | 2000 | 2000 | 1200 |
| Cutting Depth of Cutter Means (mm) | 5 | 4.5 | 0.5 |
| Copper | | | |
| Rotational Frequency of Cutter Means (rpm) | 1200 | 3200 | 3600 |
| Feeding Speed of Cutter Means (mm/min) | 200 | 600 | 520 |
| Cutting Depth of Cutter Means (mm) | 5 | 4.5 | 0.5 |

In the manufacturing method of the present invention, all the manufacturing operations including the indexing operation and the cutting operation of the material 5 are successively and automatically conducted, to thereby manufacture the golf club head or the prototype 3 thereof which is shown in FIG. 1.

The cutter means 11 may be slanted so that the axis C thereof may form a predetermined angle $\theta$ to the axis A of the holding installation as shown with imaginary lines in FIG. 1. Alternatively, the cutter means 11 can be arranged to be variable in the slanting angle thereof, namely, the angle $\theta$ as shown with the arrowhead D in FIG. 1.

If the cutter means 11 is slanted in the axis C thereof, the material can be formed with a hole which also slopes at a predetermined angle $\theta$ as desired.

As is apparent from the foregoing description, in the manufacturing method of the present invention, if only the material 5 is set in the numerically controlled computerized machine tool, it is continuously and automatically feasible, in accordance with information data inputted in advance in the controlling system, to rotate the material 5 about the axis A of the holding installation and to cut the material in a predetermined outer surface configuration of a golf club head by means of the cutter means 11 under rotation each time the rotation of the material is brought to a stop at predetermined angles or while the rotation of the material about the axis A of the machine tool is continued.

That is to say, the manufacturing method of the present invention makes it unnecessary to machine and align the reference surfaces of the material 5 before the material is subjected to a substantial machining operation thereto, whereby the manufacturing time is greatly reduced, and the machining efficiency is improved as compared with the conventional method for manufacturing golf club heads or their prototypes.

Moreover, in the manufacturing method of the present invention, the material 5 is cut in an outer surface configuration of a golf club head by turning it or changing the cutting position of the material 5 while it is held by means of the holding installation 2 of the computerized machine tool 1. This ensures the prevention of any failure to precisely position the cutting portion of the material, to thereby improve the machining accuracy in the manufacturing of golf club heads or their prototypes.

Although the present invention has been fully described by way of examples with reference to the accompanying drawings, it is to be noted here that various changes and modifications depart from the scope of the present invention, they should be construed as being included therein.

I claim:

1. A method for manufacturing golf club heads or their prototypes, characterized by the steps of holding a material of which a golf club head or a prototype thereof is made such that the material can be pivoted and indexed about a single axis of a holding installation, pivoting said material about said axis to a predetermined first machining position, cutting said material by a cutting tool in an intended outer surface configuration of a golf club head as said material and said cutting tool undergo relative movement with respect to each other in said first machining position along said holding installation axis by using a numerically controlled computerized machine tool provided with a cutter means rotated about a cutting axis that intersects the axis of said holding installation at right angles thereto, and movable along said cutting axis toward and away from said holding installation axis, and varying the angle of said machine tool with respect to said axis of the holding installation, wherein said numerically computerized machine tool is arranged to be variable in a predetermined angle of the cutter means, repeating the pivoting of said material about said holding installation axis in an indexed manner to succeeding machining positions and the cutting step in each machining position until the intended outer surface configuration is completed.

2. A method for manufacturing a golf club head or a prototype thereof using numerically controlled equipment including a holding installation and a machine tool having a rotatable cutter, said method comprising the steps of:

holding a material of which said golf club head or prototype is made for angular displacement about a single axis on said holding installation;

rotating said cutter in said machine tool about a cutting axis that is movable in a plane that intersects the holding installation axis at right angles thereto;

angularly displacing said material about said holding installation axis;

establishing relative movement between said machine tool and said material;

moving said cutter in said machine tool along said cutting axis toward and away from said holding installation axis; and varying the disposition of said machine tool to vary the angle of said cutting axis with respect to said holding installation axis whereby said material is cut in a predetermined outer surface configuration of a golf club head.

3. The method according to claim 2 in which said material is angularly displaced continuously about said holding installation axis and said machine tool is fed along said holding installation axis.

4. The method according to claim 2 in which said material is angularly displaced continuously about said holding installation axis and is fed along said holding installation axis.

5. The method according to claim 2 in which said material is angularly displaced continuously about said holding installation axis and said machine tool is fed along said holding installation axis and in a direction transversely thereto.

6. The method according to claim 2 in which said material is angularly displaced continuously about said holding installation axis and fed along said holding installation axis and in a direction transversely thereto.

7. The method according to claim 2 in which said material is angularly displaced about said holding installation axis to a predetermined first machining position and said machine tool is fed along said holding installation axis and in a direction transversely thereto, and including the steps of repeating the angular displacement of said material in an indexed manner to succeeding machining positions and the feeding of said machine tool along said holding installation axis and in a direction transversely thereto in each machining position until the intended outer surface configuration of a hold club head is complete.

8. The method according to claim 2 in which said material is angularly displaced about said holding installation axis to a predetermined first machining position and is fed in said first machining position along said holding installation axis and in a direction transversely thereto, and including the steps of repeating the angular displacement of said material in an indexed manner to succeeding machining positions and the feeding of said material along said holding installation axis and in a direction transversely thereto in each machining position until the intended outer surface configuration of a golf club head is complete.

9. The method according to claim 2 in which said material is angularly displaced about said holding installation axis to a predetermined first machining position and said machine tool and said material are caused to undergo relative movement with respect to each other in said first machining position along said holding installation axis and in a direction transversely thereto, and including the steps of repeating the angular displacement of said material in an indexed manner to succeeding machining positions and the relative movement between said machine tool and said material in each machining position until the intended outer surface configuration of a golf club head is completed.

10. A method for manufacturing a golf club head or a prototype thereof using numerically controlled equipment including a holding installation and a machine tool having a rotatable cutter, said method comprising steps of:

holding a material of which said golf club head or prototype is made for angular displacement about a single axis on said holding installation;

rotating said cutter in said machine tool about a cutting axis that is movable in a plane that intersects the holding installation axis at right angles thereto;

angularly displacing said material about said holding installation axis to a first predetermined machining position;

establishing selected relative movements between said machine tool and said material in said first machining position including at least one of relative movement in a direction along said holding installation axis and relative movement in a direction transversely thereto;

moving said cutter in said machine tool along said cutting axis toward and away from said holding installation axis to cut said material; and repeating the steps in an indexed manner of angularly displacing said material to succeeding machining positions and the selected relative movement between said machine tool and said material in each machining position until said material is cut to provide a predetermined surface configuration of a golf club head.

11. The method according to claim 10 wherein said material cut by a cutting blade fit to said cutter in limits N at an end thereof and limits M at side portions thereof in which said limits N and M are expressed by the formula: $(M+N) \leq 60$ mm.

12. The method according to claim 10 in which, when the material is wood, plastics, clay, or other similar substance, said machine tool is operated to provide said cutter with 500 to 4500 rpm in rotational frequency, 100 to 2500 mm per minute in feeding speed, and 0.1 to 60 mm in cutting depth.

13. The method according to claim 10 in which, when the material is metal, said machine tool is operated to provide said cutter with 300 to 4000 rpm in rotational frequency, 50 to 800 mm per minute in feeding speed, and 0.01 to 60 mm in cutting depth.

* * * * *

UNITED STATES PATENT AND TRADEMARK OFFICE
CERTIFICATE OF CORRECTION

PATENT NO. : 5,368,422
DATED : November 29, 1994
INVENTOR(S) : Masatoshi Banji

It is certified that error appears in the above-indentified patent and that said Letters Patent is hereby corrected as shown below:

On the title page: Item[75], "Sumitomo Rubber industries, Inc." should read —Sumitomo Rubber Industries, Ltd. —.

Signed and Sealed this

Twenty-ninth Day of August, 1995

Attest:

BRUCE LEHMAN

*Attesting Officer*     *Commissioner of Patents and Trademarks*